US012180752B2

(12) United States Patent
Grosso

(10) Patent No.: US 12,180,752 B2
(45) Date of Patent: Dec. 31, 2024

(54) RESTRAINT DEVICE

(71) Applicant: EMPROKING LTD., Hicksville, NY (US)

(72) Inventor: Thomas Grosso, Hicksville, NY (US)

(73) Assignee: EMPROKING LTD., Hicksville, NY (US)

( * ) Notice: Subject to any disclaimer, the term of this patent is extended or adjusted under 35 U.S.C. 154(b) by 0 days.

(21) Appl. No.: 18/209,192

(22) Filed: Jun. 13, 2023

(65) Prior Publication Data

US 2024/0076910 A1 Mar. 7, 2024

Related U.S. Application Data

(63) Continuation of application No. 17/903,154, filed on Sep. 6, 2022, now Pat. No. 11,713,599.

(51) Int. Cl.
*E05B 75/00* (2006.01)

(52) U.S. Cl.
CPC .................................... *E05B 75/00* (2013.01)

(58) Field of Classification Search
CPC ........ E05B 75/00; E05B 73/00; Y10T 70/404; A61F 5/37; B65D 63/1072; B65D 2563/106; B65D 2563/107; B65D 2563/108
USPC ...................................... 70/16, 19; 24/16 PB
See application file for complete search history.

(56) References Cited

U.S. PATENT DOCUMENTS 2,759,390 A * 8/1956 Edwards ................. F16B 21/10
16/86 A
3,621,681 A * 11/1971 Mikesic ................ A61F 5/3715
24/339
5,088,158 A * 2/1992 Burkholder ............. E05B 75/00
D22/199
5,400,623 A * 3/1995 Bota ....................... E05B 75/00
128/869
6,105,210 A * 8/2000 Benoit ............... B65D 63/1063
24/17 AP (Continued)

OTHER PUBLICATIONS

Safariland Disposable Double Cuff. Datasheet [online]. Galls, LLC, 2017 [retrieved on Sep. 6, 2022]. Retrieved from the Internet: <URL: https://www.galls.com/safariland-disposable-double-cuff-10-pack-?PMWTNO=000000000002187&PMSRCH=>.

(Continued)

*Primary Examiner* — Suzanne L Barrett

(74) *Attorney, Agent, or Firm* — Long Island Patent Attorney, P.C.; Daniel T. Weglarz, Esq.

(57) ABSTRACT

A restraint device tailored for law enforcement and military applications. The utility device has a tape section, a handle, and a head. The handle is connected to a proximal end of the tape section and the head is connected to a distal end of the tape section. The restraint device is provided in an expanded state that defines a loop, in which the tape section passes through an aperture in the head. Ideally, the tape section includes a stop that restricts the tape section from freely traveling through the aperture in the head. The handle preferably comprises a fastening point, which accommodates connecting the handle of the restraint device to another object. Some embodiments of the fastening point include a spring-loaded gate. The restraint device is a compact, portable, and versatile tool capable of facilitating a wide range of law enforcement and military practices.

17 Claims, 5 Drawing Sheets

(56) References Cited

U.S. PATENT DOCUMENTS

| | | | | |
|---|---|---|---|---|
| 6,523,228 | B1 * | 2/2003 | Benoit | B65D 63/1063 24/16 PB |
| 7,201,025 | B2 * | 4/2007 | Mahre | A63B 55/40 24/481 |
| 9,194,161 | B2 * | 11/2015 | Parsons | E05B 75/00 |
| 10,294,698 | B1 * | 5/2019 | Bartak | E05B 75/00 |
| 10,760,715 | B1 * | 9/2020 | Livingston | H02G 3/32 |
| 11,268,304 | B2 * | 3/2022 | Parsons | E05B 75/00 |
| 2003/0088948 | A1 * | 5/2003 | Cook | F16L 3/2336 24/16 PB |
| 2007/0151081 | A1 * | 7/2007 | Bauer | B65D 63/18 24/16 PB |
| 2008/0040896 | A1 * | 2/2008 | Parsons | E05B 75/00 24/16 PB |
| 2010/0083469 | A1 * | 4/2010 | Welker | A45F 5/1026 16/425 |
| 2010/0162775 | A1 * | 7/2010 | Martinez | E05B 75/00 29/428 |
| 2010/0269548 | A1 * | 10/2010 | Harrington | E05B 75/00 70/16 |
| 2015/0068256 | A1 * | 3/2015 | Flynn | E05B 75/00 70/16 |
| 2015/0176313 | A1 * | 6/2015 | Hines | E05B 75/00 70/16 |
| 2016/0040456 | A1 * | 2/2016 | Smith | E05B 75/00 2/158 |
| 2018/0201421 | A1 * | 7/2018 | Vorhis | B65D 63/1054 |
| 2018/0244447 | A1 * | 8/2018 | Chmelar | B65D 63/1027 |
| 2020/0100930 | A1 * | 4/2020 | Gilbert, Jr. | A61F 5/37 |
| 2021/0077290 | A1 * | 3/2021 | van Beek | A61F 5/03 |

OTHER PUBLICATIONS

ASP Tri-Fold Disposable Restraints. Datasheet [online]. Galls, LLC, publication date unknown [retrieved on Sep. 6, 2022]. Retrieved from the Internet: <URL: https://www.galls.com/asp-tri-fold-disposable-restraints-6-pack-?PMWTNO=000000000002187&PMSRCH=>.

Cobra Cuffs Disposable. Datasheet [online]. Galls, LLC, publication date unknown [retrieved on Sep. 6, 2022]. Retrieved from the Internet: <URL: https://www.galls.com/cobra-cuffs-disposable-6-pack-?PMWTNO=000000000002187&PMSRCH=>.

* cited by examiner

Fig. 1
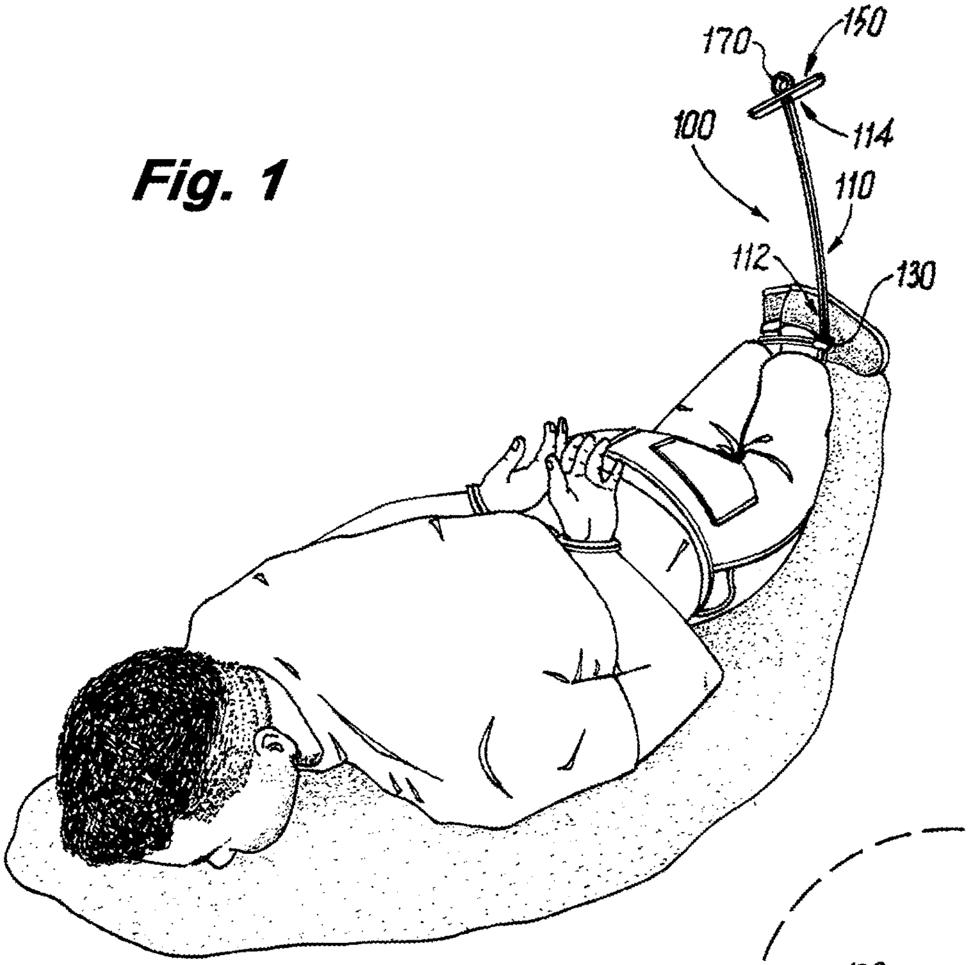
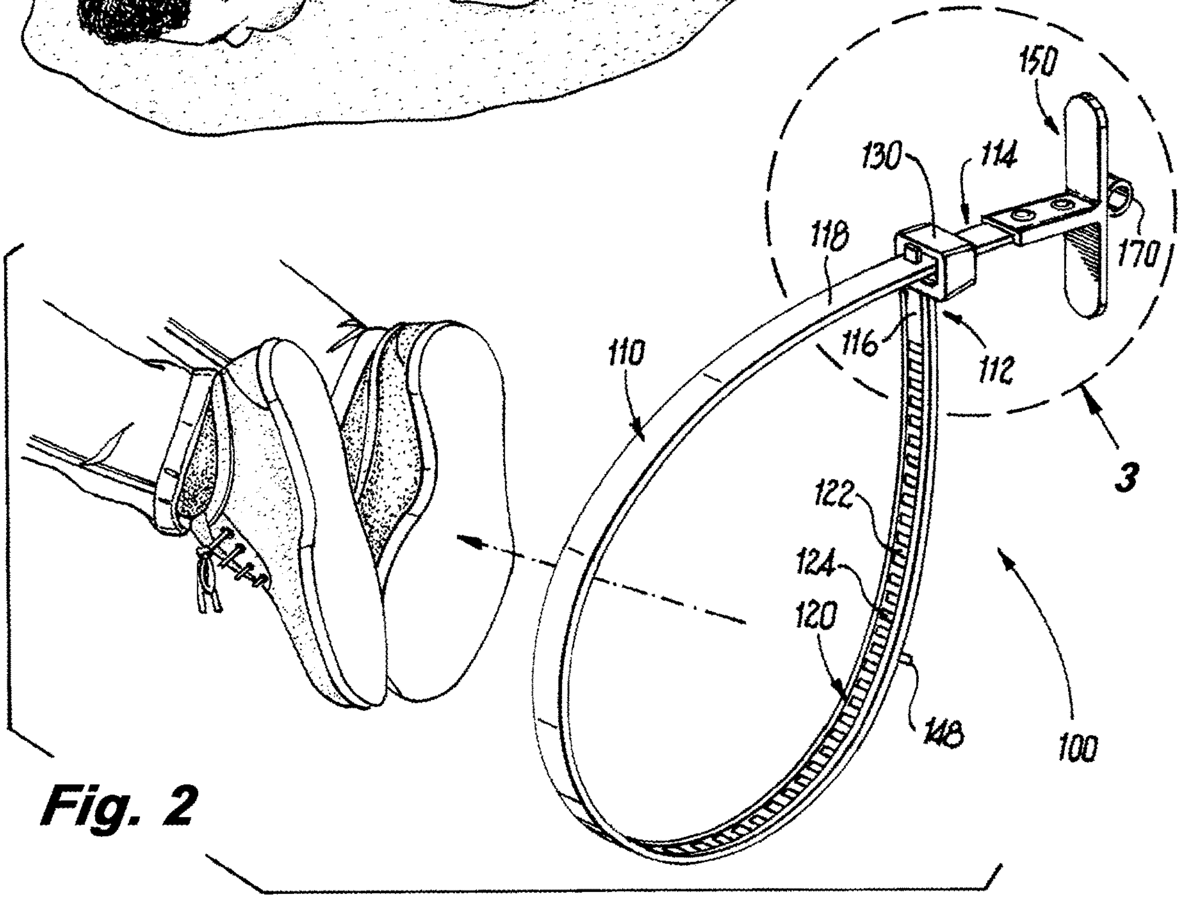
Fig. 2

Fig. 3
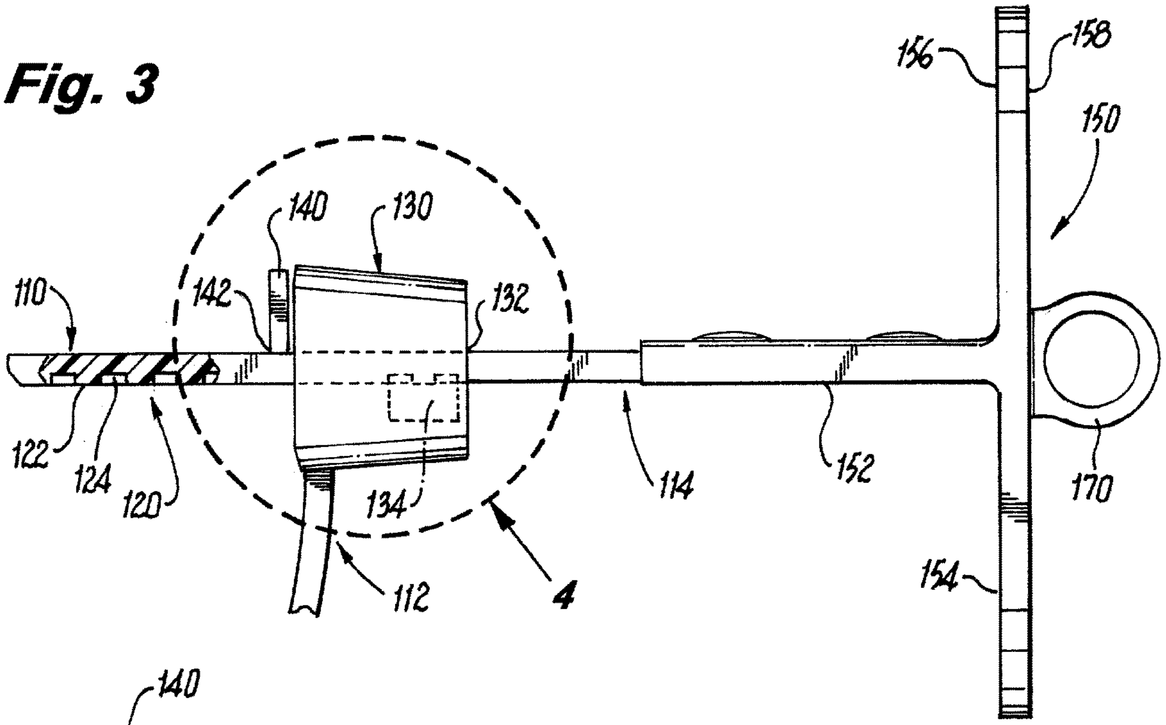
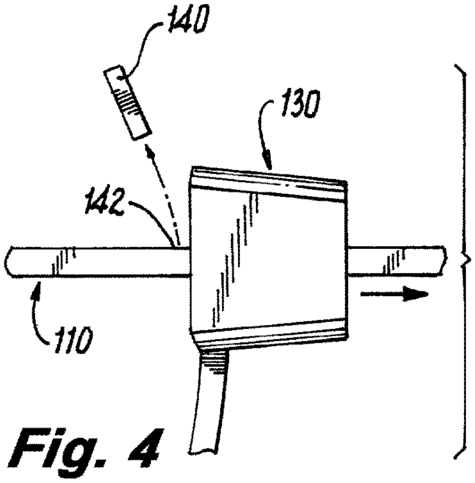
Fig. 4
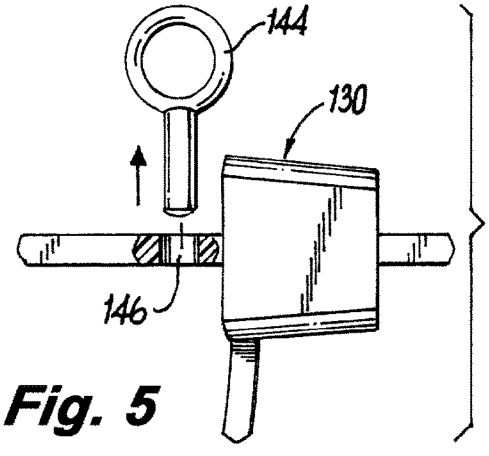
Fig. 5
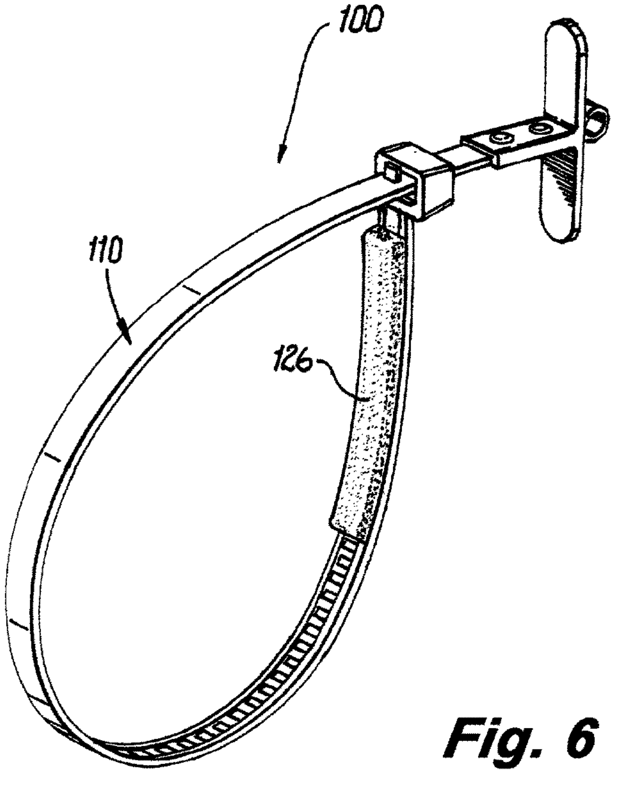
Fig. 6

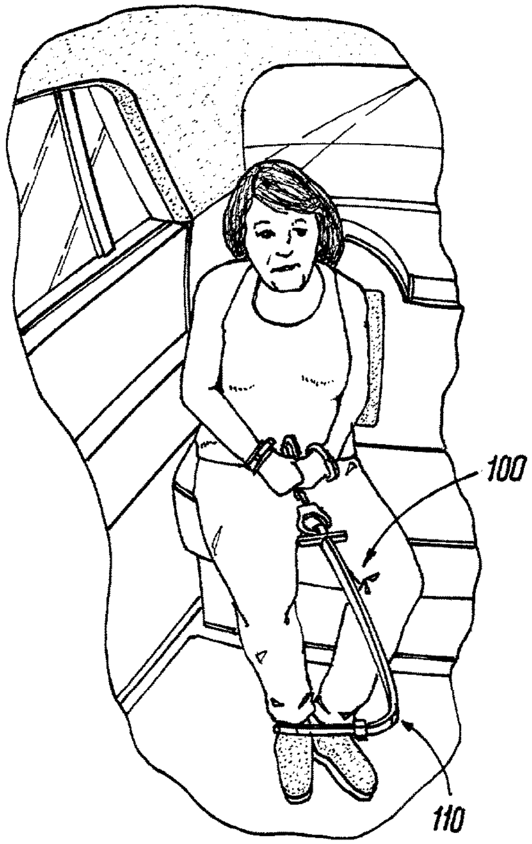
Fig. 14
Fig. 15
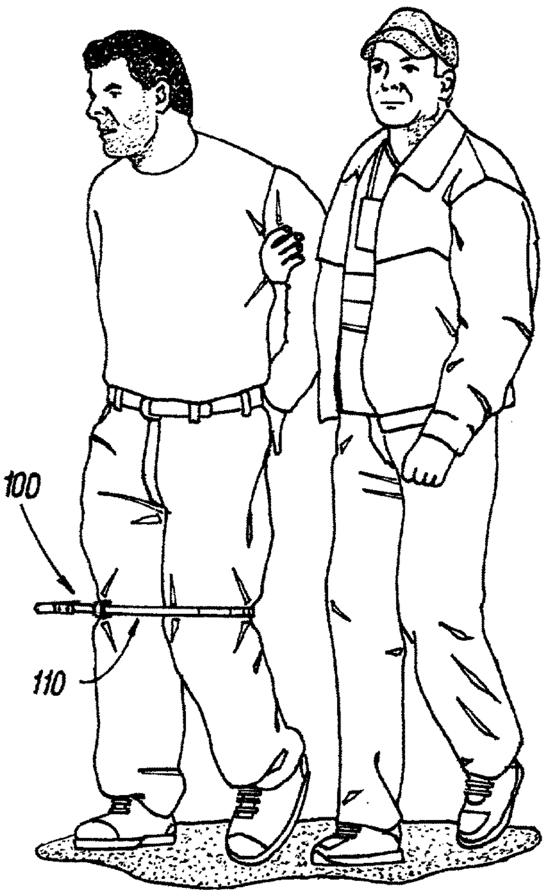
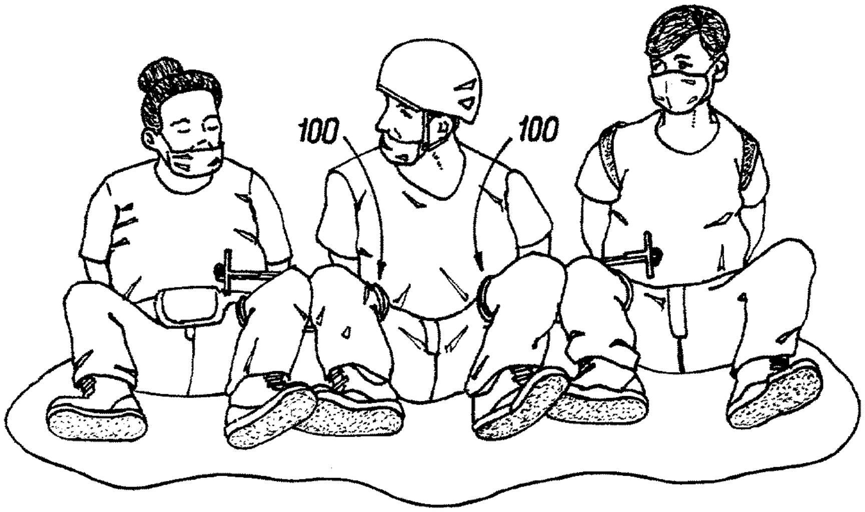
Fig. 16

RESTRAINT DEVICE

CROSS-REFERENCE TO RELATED APPLICATIONS

This application is a continuation of co-pending application Ser. No. 17/903,154, filed Sep. 6, 2022, which is hereby incorporated by reference in its entirety.

STATEMENT REGARDING FEDERALLY SPONSORED RESEARCH OR DEVELOPMENT

None

FIELD OF THE INVENTION

This invention relates generally to fasteners and, more particularly, to a physical restraint device having multiple functions for law enforcement operations.

BACKGROUND OF THE INVENTION

Description of the Prior Art

This section is intended to introduce the reader to various aspects of the art that may be related to various aspects of the present invention. The following discussion is intended to provide information to facilitate a better understanding of the present invention. Accordingly, it should be understood that statements in the following discussion are to be read in this light, and not as admissions of prior art.

The use of physical restraint devices for law enforcement and riot control is well established, and carrying a physical restraint device is common practice among law enforcement, military, and security forces. Such devices are used to help subdue, arrest, or detain individuals and prevent them from escaping custody. In fact, to law enforcement, military, and security forces, restraint devices are some of their most essential equipment. Handcuffs are a common form of a physical restraint device used to secure an individual's wrists in proximity to each other. Handcuffs include two cuffs, each with a rotating arm that engages with a ratchet to prevent the cuff from opening. While handcuffs are often constructed from steel, they can be made of various other materials. Regardless, the size and shape of typical handcuffs make it difficult to carry in large quantities.

This gave rise to the creation of plastic restraints, also known as wrist ties, riot cuffs, zip cuffs, and plasticuffs. These are plastic, disposable restraint devices similar in design to electrical cable ties adapted for law enforcement applications. Such devices are better suited for riot situations since they lend themselves well to carrying in large quantities due to their lightweight, compact design. Since they are disposable and not used on multiple subjects, they are also less likely to facilitate transmission of communicable disease than reusable handcuffs, which may harbor blood or other bodily fluids.

Plastic restraints, however, exhibit several disadvantages in comparison to metal handcuffs. In particular, prior art plastic restraints can be unwieldy to handle and difficult to deploy, especially under the stress of dangerous situations, such as when attempting to restrain a subject who is resisting arrest. When using a prior art plastic restraint similar in design to an electric cable tie, the user must feed the free end through the head on the other end while attempting to subdue the subject.

Alternatively, the user may create the loop by feeding the free end through the head ahead of time, and then loop it over the subject's wrists or ankles when needed. However, when stored and carried in the looped configuration, it runs the risk of being unintentionally tightened prematurely. Attempting to use such a device that has unintentionally been partially tightened into a smaller loop can be detrimental to the user's safety because it can dramatically increase the difficulty of looping the device over a resisting subject's hands or feet. It also requires more attention and focus to complete the task, thus decreasing the user's awareness of his surrounding environment and any potential threats posed thereby. Moreover, if a plastic restraint device is prematurely tightened into a loop that is too small to fit over a subject's hands or feet, then the device is precluded from use altogether. Naturally, a user may not discover that the restraint device has been unintentionally prematurely tightened until the moment the device is needed and retrieved for use, potentially leaving the user stranded without a useable restraint device amidst a physical altercation with a resisting subject.

A further drawback of prior art plastic restraint devices is that they can be challenging to properly tighten. For instance, once the free end is passed through the head, the user must grip the free end and pull on it forcefully to cinch down the looped portion around the subject. Given that the strap is a flat, narrow band, and may even have relatively aggressive edges provided by its rectangular cross section, it can be inherently difficult to get a secure grip on and apply sufficient tension. On top of this, the material with which such devices are constructed tends make its outer surfaces somewhat slippery and difficult to securely grip in the hand.

This is exacerbated by the anticipated conditions in which such devices are designed to be used in. Namely, in dangerous, high-pressure situations, the user's hands are likely to be somewhat sweaty and possibly dirty. The user may not be afforded the luxury of wearing gloves to help offset this dilemma and, depending on the material of a glove, gloves may do little or nothing to provide better grip on such a device. This is quite noteworthy, as law enforcement and military personnel recognize that their hands are one of their most valuable assets, and that they must be protected with high regard. Having one's hand slip down the thin, sharp-edged band of a plastic restraint when forcefully pulling its free end can be detrimental to the continued functionality of the user's hands. While a user's hand can easily be cut and draw blood in a single instance, the odds of such injury increase dramatically with the repetitious use of such devices that they are intended for. The repeated pulling on such devices when they are used on multiple subjects renders the user's hands prone to cuts, sprains, strains, and loss of dexterity.

These are merely a few of the shortcomings inherent in prior art restraint devices. Such devices can be greatly improved upon for enhanced efficiency and effectiveness in riot control applications. Thus, there remains a need for a lightweight, compact restraint device that can be easily carried and rapidly deployed without risk of injury to the user.

SUMMARY OF THE INVENTION

The present invention is a restraint device having enhanced function and greater versatility over prior art restraint devices currently employed for law enforcement and military purposes. The restraint device of the present invention includes a tape section, a handle, and a head. The handle is connected to a proximal end of the tape section and the head is connected to a distal end of the tape section. Alternatively, the handle may be a detachable handle.

The restraint device is provided in an expanded state that defines a loop, in which the tape section passes through an aperture in the head. Ideally, the tape section includes a stop that restricts the tape section from freely traveling through the aperture in the head. Such stop is selectably removable to allow the tape section to travel through the aperture in the head when desired.

The handle preferably comprises a fastening point. Some embodiments of the fastening point include a spring-loaded gate. The fastening point accommodates connecting the handle of the restraint device to another object, such as a pair of handcuffs or another restraint device, so as to offer even greater versatility.

It is an object of the present invention to provide a restraint device that is compact, portable, versatile, and capable of facilitating a wide range of law enforcement and military practices. The present invention accomplishes that by providing a restraint device that overcomes inherent shortcomings of prior art alternatives.

These and other objects will be apparent to one of skill in the art.

BRIEF DESCRIPTION OF THE DRAWINGS

FIG. 1 is a front perspective view of a restraint device built in accordance with the present invention shown in a contracted state restraining a subject's ankles.

FIG. 2 is a front perspective view of a restraint device built in accordance with the present invention shown in an expanded state being slipped over a subject's feet.

FIG. 3 is an exposed side elevation view of a restraint device built in accordance with the present invention providing an exposed view of a head and a stop.

FIG. 4 is a side elevation view of a head of a restraint device built in accordance with a detacheable tab embodiment of the present invention.

FIG. 5 is a side elevation view of a head of a restraint device built in accordance with a removable pin embodiment of the present invention.

FIG. 6 is a front perspective view of a restraint device built in accordance with a padded embodiment of the present invention shown in an expanded state.

FIG. 14 is a front perspective view of a restraint device built in accordance with the present invention shown restraining a subject sitting in the backseat of a law enforcement vehicle.

FIG. 15 is a front perspective view of a restraint device built in accordance with the present invention shown restraining a subject's legs.

FIG. 16 is a front perspective view of two restraint devices built in accordance with the present invention shown being used to bind three subjects together at their legs.

DETAILED DESCRIPTION OF THE INVENTION

Figure 7:
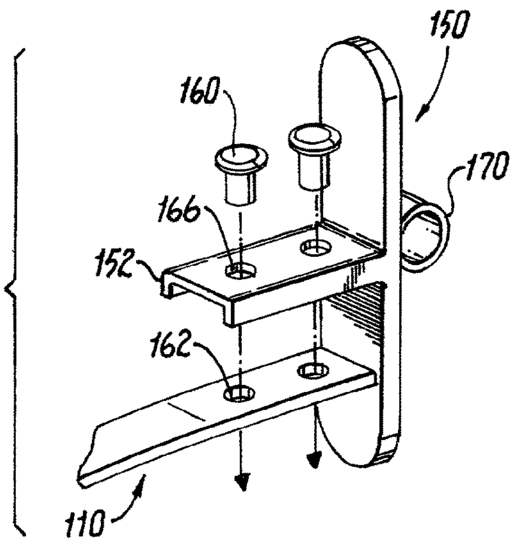
FIG. 7 is a front perspective exploded view of a proximal end of a restraint device built in accordance with an embodiment the present invention.

The present invention described herein provides for a restraint device having enhanced functionality and greater versatility over prior art restraint devices designed for law enforcement and military applications. As will become apparent throughout this disclosure, the arrangement of the elements of the invention and their dimensions specified herein provide for an incredibly valuable tool for law enforcement, military, and security personnel. Moreover, the invention lends itself perfectly to existing law enforcement practices and techniques while embodying an intentionally simplistic design custom tailored to facilitate real-world use in the field.

While the present invention is disclosed herein against the backdrop of law enforcement and the potential applications in which such a device could be useful to law enforcement and military personnel, it is contemplated that the invention may be equally valuable in other applications, such as applications in which prior art cable ties are ordinarily employed.

The ensuing description provides preferred exemplary embodiments only, and is not intended to limit the scope, applicability, or configuration of the disclosure. Rather, the ensuing description of the preferred exemplary embodiments will provide those skilled in the art with an enabling description for implementing preferred and exemplary embodiments of the disclosure. It is apparent to a person of ordinary skill in the art, however, that the present invention may be practiced through many embodiments other that those illustrated. It should be understood that various changes may be made in the function and arrangement of elements without departing from the spirit and scope of the invention as set forth in the appended claims.

For the purposes of this disclosure, certain directional terms that may be used herein are used to facilitate the description of the invention. Unless otherwise specified or made apparent by the context of the discussion, such terms and the like should be interpreted with reference to the figure(s) under discussion. Such terms are not intended as a limitation on the position in which the invention or components may be used. It is contemplated that the components of the invention may be easily positioned in any desired orientation for use. Likewise, numerical terms, such as "first" and "second" are not intended as a limitation or to imply a sequence, unless otherwise specified or made apparent by the context of the discussion.

A number of terms may be clarified to facilitate understanding of the invention. The term "operatively connected" is understood to include a linking together of the portions under consideration and may include a physical engagement and/or a functional or operational connection.

Referring now to the drawings and in particular FIGS. 1, 2, 3, 4, 5, 6, 7, 8, 9, 10, 11, 12, 13, 14, 15, and 16, a restraint device 100 for law enforcement use is shown having a flexible tape section 110, a head 130, and a handle 150.

The restraint device 100 may be constructed of various materials, including stainless steel and other metal products, thermoplastics, and synthetic polymers, such as nylon. The different elements of the restraint device 100 may be all constructed of the same material, or different materials may be used to form different elements of the device. Ideal materials for the construction of the device are ones that are strong, durable, and abrasion resistant. The properties of nylon make it particularly well-suited for the intended uses contemplated herein. Additionally, any portion of the restraint device 100 may be made of, coated with, or treated with an abrasion-resistant or non-corrodible material. Such characteristics can enhance the device's tamper-resistant qualities and help make the device impervious to physical tampering by a subject, degradation through contact with chemicals, as well as wear and tear while carrying the device that could compromise the integrity of materials composing the restraint device 100.

The tape section 110 is a flexible, elongated member formed into a tape having a distal end 112 at which the head 130 is positioned, and a proximal end 114 at which the handle 150 is positioned. In the preferred embodiment, the tape section 110 is a substantially flat elongated member with a planar bottom surface 116, a planar top surface 118, two side surfaces, and a generally rectangular cross section. The tape section 110 may be between 0.25 inches and 2.00 inches wide. Embodiments of the tape section 110 may have a width of 0.75 inches. Embodiments of the tape section 110 may have a length of 48.00 inches.

At least one of the planar bottom surface 116 and the planar top surface 118 of the tape section 110 incorporates an integrated rack 120 featuring a series of alternating toothlike projections 122 and/or notches 124 (such as spaces between the projections 122) that each span the width of the tape section 110. The integrated rack 120 may extend along the entire length or a partial length of the tape section 110 between the head 130 and the handle 150.

The head 130 may be operatively connected to or integrally formed with the distal end 112 of the tape section 110. The head 130 has an aperture 132 configured to enable the tape section 110 to pass through it. The restraint device 100 is provided with the tape section 110 passing through the aperture 132 of the head 130 to form a loop configuration in an expanded state, as shown in FIG. 2.

The head 130 houses a pawl 134 in the form of a lever or tongue operatively connected at one end to head 130. The free end of the pawl 134 is configured to glide over the projections 122 and fall into the notches 124 as the tape section 110 slides through the aperture 132 in the direction towards the proximal end 114. The free end of the pawl 134 is further configured to occupy the notches 124 and engage the projections 122 to prevent the tape section 110 from sliding through the aperture 132 in the direction towards the distal end 112. In this manner, with the restraint device 100 in a loop configuration as described above, the pawl 134 allows the tape section 110 to freely traverse through the aperture 132 of the head 130 in only one direction so as to incrementally tighten the loop formed thereby, while preventing the tape section 110 from traversing through the aperture 132 in the opposite direction to expand the size of the loop.

Figure 12:
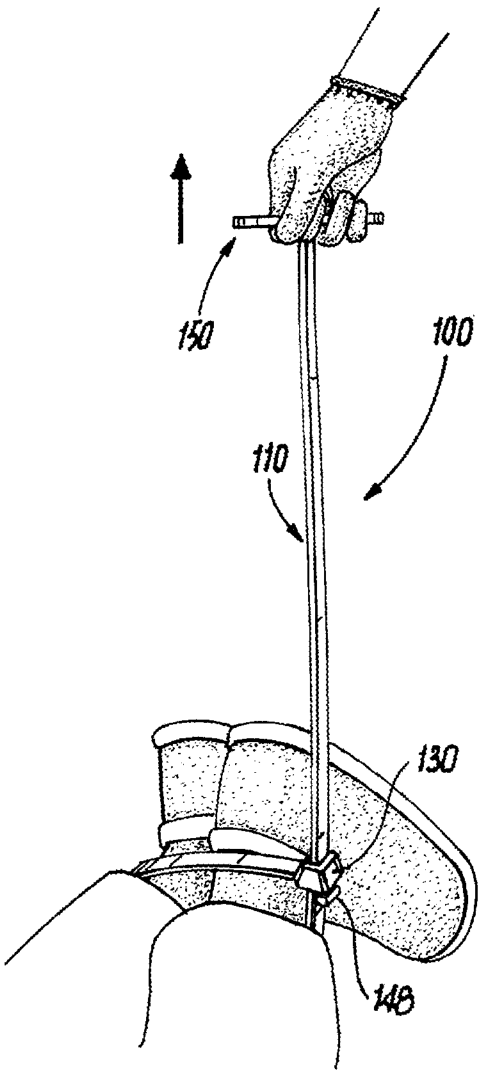
FIG. 12 front perspective view of a restraint device built in accordance with the present invention shown in a contracted state restraining a subject's ankles.

The restraint device 100 is provided in an expanded state in which the loop formed by the tape section 110 exhibits a maximum circumference, as depicted in FIG. 2. During use of the restraint device 100, the device in its expanded state is passed over a subject's limbs to encircle them as illustrated in FIG. 2. Then the tape section 110 is pulled through the aperture 132 in the direction toward the proximal end 114 to cinch the loop into a contracted state in which it exhibits a smaller circumference, as shown in FIGS. 1 and 12. In this way, the restraint device 100 may be selectably and incrementally tightened to sufficiently secure the subject's limbs together.

In one embodiment, the integrated rack 120 along the tape section 110 commences at or near the proximal end 114 and extends only part of the length of the tape section 110. This provides a safety feature in that it imposes a limit on how much the restraint device 100 can be tightened, thus preventing unintentional overtightening.

In yet another embodiment, unintentional overtightening is prevented by a blocker 148 on the tape section 110, as shown in FIGS. 2 and 12. The blocker 148 contemplated may be any mechanism, whether proprietary or in the prior art, for preventing the tape section 110 from traveling through the aperture 132 in the direction toward the proximal end 114 past a specific point, thus precluding the restraint device 100 from tightening beyond a predetermined limit. Preferably, the blocker 148 is a projection on one surface of the tape section 110. The blocker 148 may be a separate structure that is operatively connected to the tape section 110 or it may be integrally formed with the tape section 110. It may be constructed from the same material as the tape section 110 or an entirely different material.

The blocker 148 does not fit through the aperture 132 in the head 130, therefore blocking the head 130 from traversing past such location on the tape section 110. While a user of the restraint device 100 must always employ skill and sound judgment when tightening the device around a subject, the blocker 148 provides a helpful safety feature to help maintain the subject's safety by preventing overtightening, which can lead to reduced circulation or nerve damage. One skilled in the relevant art will recognize multiple other mechanisms that may provide the blocker 148 other than the form illustrated in the Figures.

Additionally or alternatively, the tape section 110 may be equipped with a layer of padding 126 operatively connected to and at least partially covering the planar bottom surface 116, as shown in FIG. 6. This padding 126, which occupies the interior surface of the loop formed by the restraint device 100, provides cushioning between the tape section 110 and a subject's limbs for both safety and comfort.

While it is exceedingly advantageous to store and carry a restraint device in a state in which it is ready to be deployed without pre-use setup, realizing such benefit has been rendered infeasible by the very design of prior art plastic restraints. It would be very desirous to carry a plastic restraint in an expanded state as described above in order to save the user from having to perform the arduous setup process required to use a prior art plastic restraint. The typical setup process of a prior art plastic restraint includes finding which side of the tape has the projections, determining the proper orientation in which to form a loop out of the tape and feed the proximal end through the head, and feeding the proximal end through the aperture in the head.

As can be greatly appreciated by anyone who has had to use a plastic restraint to subdue an aggressively resisting subject, the aforementioned setup process invites grave danger into an already dangerous situation. Namely, the required setup process leaves the user with a choice between two equally risky options. The first option is to attempt to perform the setup process at the time the plastic restraint is needed. For example, when the user is in the midst of attempting to restrain a subject, and potentially wrestling with an aggressively resisting subject who may even be attempting to inflict physical injury upon the user, the user would have to retrieve the elongated plastic restraint, closely inspect it to determine the proper orientation of the tape and which side of the aperture in the head is the side that the proximal end of the tape needs to be inserted into, locate and grasp the proximal end of the tape section and meticulously feed it through the tiny, tight-fitting aperture like threading a needle. While performing this setup process can be difficult enough even when not under the pressure of a dangerous situation, especially for users with challenged eyesight, it can be exponentially more difficult to perform in a high-stakes situation, such as attempting to restrain a violent subject while surrounded by other potential threats inherent in unlawful riot situations.

The alternative option a user is presented with is even more unsettling. This option entails performing the setup process ahead of time while not in harm's way, and then simply carrying the plastic restraint in an expanded state with the proximal end of the tape section already inserted through the aperture in the head so that, when the plastic restraint is retrieved for use in this looped configuration, it can simply be placed around a subject's limbs and tightened down into a contracted state. Although this option may appear valuable at first glance, in practice, it can be disastrous. When placing the safety of the user and the public in the hands of a restraint device, the user relies on that device to be ready when it's needed. However, a plastic restraint that has been stored and carried in this "ready-to-use" expanded state may be discovered to be anything but ready for use when it is retrieved. Foreseeably, when carried on a user's belt or in a pouch, gear bag, or clothing pocket, the plastic restraint can be unintentionally tightened into a contracted state prematurely, either fully or partially. Thus, when the user retrieves the plastic restraint for emergency use, the loop may be too small in circumference to place over a subject's limbs, leaving the user stranded without a viable means of restraining an aggressive subject. The only thing more dangerous than not having a readily accessible restraint device is mistakenly believing a viable restraint device is available when, in actuality, it is not.

To address this massive shortcoming, the tape section 110 in the preferred embodiment of the instant invention includes a stop 140, as illustrated in FIGS. 3, 4, and 6. The stop 140 contemplated may be any mechanism, whether proprietary or in the prior art, for preventing the tape section 110 from traveling through the aperture 132 in the direction toward the proximal end 114, thus precluding the restraint device 100 from tightening while the stop 140 is in place. In the embodiment represented in FIGS. 3, 4, and 6, the stop 140 is portrayed as a detacheable tab situated on the tape section 110 slightly distal of the portion of the tape section 110 that is residing within the aperture 132 of the head 130. For the sake of brevity, the stop 140 is shown in FIGS. 3, 4, and 6 as removably attached to the top surface 118 of the tape section 110, but it is contemplated that a stop 140 may alternatively or additionally be removably attached to the bottom surface 116 or one of the side surfaces of the tape section 110. Any known method in the prior art may be utilized for removably attaching the stop 140 to the tape section 110. In the embodiment of FIGS. 3, 4, and 6, the stop 140 in the form of a tab connected to the tape section 110 through a frangible joint 142 configured such that the stop 140 can be broken off of the tape section 110 with sufficient force.

The tape section 110 with the stop 140 affixed does not fit through the aperture 132 in the head 130, therefore blocking the head 130 from traversing past such location on the tape section 110. This enables the user to store and carry the restraint device 100 in its "ready to use" expanded state without fear of it being unintentionally cinched down into a partially or fully contracted state prematurely, thereby overcoming a major hurdle posed by inferior prior art plastic restraints. Upon retrieving the restraint device 100 for use, the stop 140 may be snapped off at the joint 142 or otherwise detached from the tape section 110, allowing the tape section 110 to be pulled through the aperture 132 of the head 130 to cinch the restraint device 100 into a contracted state when, and only when, desired.

Similarly, in an alternate embodiment, the stop may be provided by a pin 144, as depicted in FIG. 5. In such embodiment, the tape section 110 includes a pin aperture 146 configured to receive the pin 144. In this manner, while the pin 144 resides in the pin aperture 146, it serves to block the head 130 from traveling along the tape section 110 past the pin aperture 146. When the restraint device 100 is to be deployed, the pin 144 may be withdrawn from the pin aperture 146 to allow the restraint device 100 to be cinched into a contracted state. One skilled in the relevant art will recognize multiple other mechanisms that may provide the stop 140 for the purposes of maintaining the restraint device 100 in an expanded state as outlined herein.

It is recognized that a user's safety while using a plastic restraint depends on the ability to quickly, effortlessly, and securely grasp the proximal end and exert a substantial amount of tension on it while tightening it around a subject. Naturally, this requires the user to have a significant degree of dexterity in the hands. Even with reasonable dexterity, it can be challenging to get a secure enough grip on the proximal end to forcefully pull on it without slipping off of it, especially taking into account the shape and surface finish of prior art plastic restraints. Given the potential for sharp edges along the tape section provided by its rectangular cross section, a user's hand may sustain injury from slipping even short distances along the tape section when tightly squeezing it. The risk of slipping is further elevated when the user's hands are sweaty, wet, or dirty, as is highly likely in the dangerous, high-pressure environments that plastic restraints are intended to be used in. Once a user sustains a flesh wound that draws blood, the user's hand may become even more slippery, as well as prone to infection. Wearing gloves fails to adequately address this major problem, as gloves can potentially increase the risk of slipping or losing one's grip on the device, assuming, for the sake of argument, that the user even has the option of wearing gloves.

As noted above, any amount of slipping can bring a great degree of danger to the user. Slipping completely off a plastic restraint while attempting to restrain a subject can lead to the subject escaping and potentially inflicting harm on the user or other individuals. Equally alarming is the risk of injury to the user's hand that arises when one's hand slips along the plastic restraint, regardless of how short a distance the hand slips. A user may sustain a hand injury, including cuts, sprains, strains, and loss of dexterity, from even a single use of a plastic restraint, but the risk drastically increases with repeated use of plastic restraints, as is common practice in riot situations. Some of these injuries, such as sprains and loss of dexterity, may arise simply from gripping and pulling on a plastic restraint too hard, even if no slipping occurs. Law enforcement and military personnel appreciate that their hands are among their most important tools, and exposing their hands to injury endangers themselves, their comrades, and their mission.

To overcome these severe inadequacies of prior art plastic restraints, the restraint device 100 of the instant invention ideally includes an ergonomic handle 150 operatively connected to the tape section 110 at the proximal end 114, as shown in FIGS. 2 and 3. The handle 150 may be any shape and size that provides for an enhanced grip on the proximal end 114 of the tape section 110. In the preferred embodiment, the handle 150 has a first section 152 substantially parallel to the tape section 110 and a second section 154 substantially perpendicular to the first section 152, such that the handle 150 defines a "T" shape, as depicted in FIGS. 2 and 3. In the preferred embodiment, the perpendicular second section 154 is a substantially flat member with a rectangular cross section having a bottom surface 156 and a planar top surface 158 at least as wide as the width of the planar top surface 118 of the tape section 110, and two side surfaces providing a thickness at least as thick as the side surfaces of the tape section 110, as shown in FIGS. 2 and 3. As illustrated, the width of the second section 154 (measured across the bottom surface 156) is greater than its thickness (measured across the side surfaces of the second section 154). In this embodiment, the side surfaces of the second section 154 are oriented substantially parallel with the side surfaces of the tape section 110, and the planar bottom surface 156 faces towards the head 130. In this manner, when tightening the restraint device 100, the user may grip the perpendicular second section 154 and pull on its bottom surface 156 to pull the tape section 110 through the head 130 in the direction towards proximal end 114.

Figure 9:
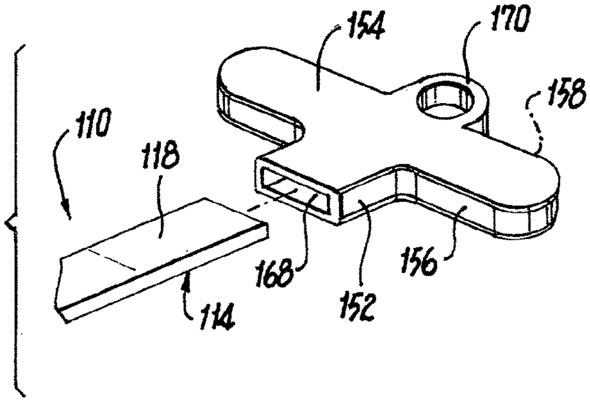
FIG. 9 is a front perspective exploded view of a proximal end of a restraint device built in accordance with a flat handle embodiment of the present invention.

In an alternate embodiment having a flat handle as illustrated in FIG. 9, the second section 154 of the handle 150 has a width that is less than its thickness when using the same dimension labeling convention relied on above. In other words, the second section 154 of this embodiment orients its largest surface in a plane parallel with the top surface 118 of the tape section 110. This version of the shape of the handle 150 may be desirable for some applications, however, it is not the ideal embodiment because the bottom surface 156 upon which a user primarily applies force when tightening the restraint device 100 exhibits a smaller amount of surface area than in other embodiments, thereby exerting more pressure on the user's hand.

While the first section 152 and perpendicular second section 154 of the handle 150 are depicted having a rectangular cross section in the Figures for the sake of brevity, it is recognized that either or both of these sections may be cylindrical having a circular cross section.

Figure 10:
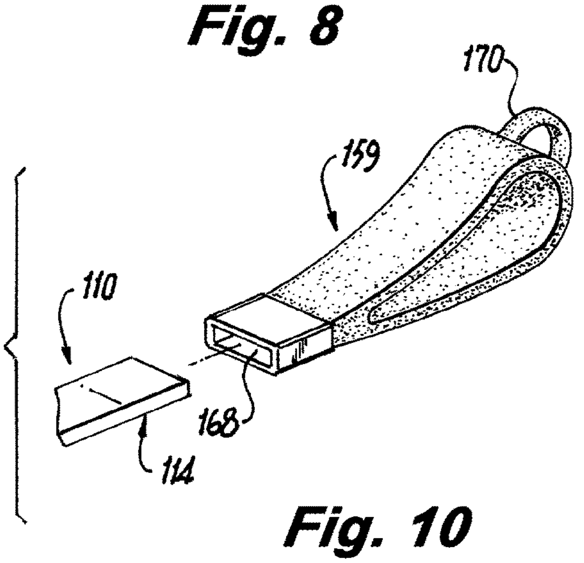
FIG. 10 is a front perspective exploded view of a proximal end of a restraint device built in accordance with a loop handle embodiment of the present invention.

Alternatively, the handle 150 may define a loop 159, as illustrated in FIG. 10. In this embodiment, as with other embodiments, the handle 150 may be a separate structure that is operatively connected to the proximal end 114 of the tape section 110 or it may be integrally formed with the tape section 110. Likewise, as in other embodiments, the handle 150 of this embodiment may be constructed from the same material as the tape section 110 or an entirely different material, including nylon. For example, since the primary purpose of the loop 159 is to allow a user's hand or fingers to pass through the loop 159 when gripping it, it is not imperative that this version of the handle 150 be rigid, as is desirable in the embodiments of FIGS. 7, 8, and 9. In fact, it may even be more advantageous to construct the loop 159 from a softer, more flexible material so that it does not bite into a user's hand or fingers as aggressively when pulling on the handle 150 with substantial tension. For example, nylon webbing may serve this purpose exceptionally well. This embodiment is especially valuable for some of the anticipated uses of the restraint device 100 that will be discussed herein, such as dragging or hauling equipment, a person, or other load. Preferably, the handle 150 of this embodiment defines a loop 159 so dimensioned to easily fit around an average-sized adult hand when wearing a glove. Thus, a gloved or bare hand may easily enter and exit the loop 159 to engage and disengage with the handle 150 without impediment. Embodiments of the handle 150 define a loop 159 having a circumference of 14.00 inches.

The handle 150 is very advantageous in situations in which the tape section 110 will be subjected to a particularly high tensile force, thereby exerting a relatively greater force on the user's hand, such as when using the restraint device 100 to haul or drag heavy loads. In this regard, the handle 150 operates to reduce the pressure felt on the user's hand by distributing the forces over an increased surface area. And, more importantly, it provides an effective means for quickly and easily pulling on the proximal end 114 of the tape section 110 with the desired amount of force and without slipping along or off the tape section.

Irrespective of its shape, the handle 150 may be operatively connected to the proximal end 114 of the tape section 110 by various methods, several of which will be described here. For instance, the handle 150 may employ rivets 160 to operatively connect the handle 150 to the tape section 110. As shown in FIG. 7, the proximal end 114 of the tape section 110 and the first section 152 of the handle 150 may each possess one or more apertures 162 configured for receiving a rivet 160 or other fastener. If multiple pairs of corresponding rivets 160 and apertures 162 are provided, the rivets 160 and apertures 162 are spaced equidistant so as to be concentrically aligned when the handle 150 and tape section 110 are connected. It is also recognized that a screw, nut and bolt, cotter, peg, adhesive, weld, or various other fasteners may be utilized in place of the rivet 160, as will be readily apparent to one of ordinary skill in the relevant art.

Figure 8:
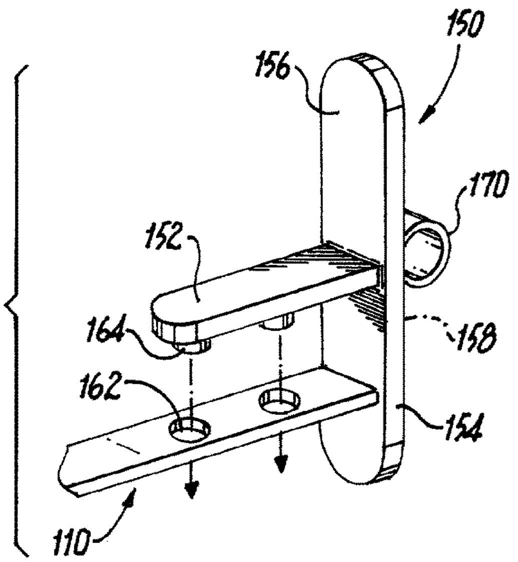
FIG. 8 is a front perspective exploded view of a proximal end of a restraint device built in accordance with an embodiment of the present invention.

As represented in FIG. 8, one surface of the first section 152 of the handle 150 may include one or more projections 164 extending from such surface, and the proximal end 114 of the tape section 110 may possess one or more coinciding apertures 166 configured to receive and mate with the projections 164. The projections 164 may engage and cooperate with the apertures 166 using cooperating threads, friction fit, adhesive, welding, or other known fastening mechanisms, to operatively connect the first section 152 of the handle 150 to the tape section 110. If multiple pairs of corresponding projections 164 and apertures 166 are provided, the projections 164 and apertures 166 are spaced equidistant so as to be concentrically aligned when the handle 150 and tape section 110 are connected.

FIG. 9 shows an embodiment in which the first section 152 of the handle 150 includes an orifice 168 configured to receive and mate with the proximal end 114 of the tape section 110. Here, the proximal end 114 of the tape section 110 may be inserted into the orifice 168 and may be secured in place using an adhesive, weld, or any fastener known in the prior art that is suitable for this purpose.

While not the optimal solution, some embodiments of the restraint device 100 may comprise a detachable handle 150 that is removably connected to the proximal end 114 of the tape section 110 using any known fastener suitable for this purpose. Such detachable handle 150 enables a user to securely and selectably detach and attach it to the proximal end 114 of the tape section 110 as desired.

The ability to provide an ergonomic handle has previously been unattainable for existing designs in the prior art. For example, prior art plastic restraints that are provided in a straight, outstretched configuration require the user to meticulously thread a first end of the device through the tiny, tight-fitting hole in a head on the other end of the device to form a looped configuration. If the first end of the device included a handle, it would be impossible to fit it through the hole in the head to form a looped configuration. Providing a handle 150 as contemplated by the instant invention necessitates that such a handle be operatively connected to the proximal end 114 of the tape section 110 after the proximal end 114 is fed through the aperture 132 in the head 130 to form a looped configuration as represented in FIGS. 2 and 6. However, attaching the handle 150 to the tape section 110 in a sufficiently secure manner is most feasible only if performed during manufacture of the restraint device 100 and if the restraint device includes structural design features to facilitate securely fastening the handle 150 to the tape section 110, such as the rivets 160 and other fasteners contemplated above.

Moreover, there is no adequate solution in prior art for providing a plastic restraint already in a looped configuration because providing a prior art plastic restraint in a looped configuration exposes it to the critical risks described above, such as the risk of it being unintentionally tightened into a contracted state prematurely. Providing a plastic restraint in looped configuration is highly desirable, yet previously has been an unacceptable solution in light of the inherent dangerous risks inherent in this solution. This single crucial drawback can possibly outweigh any benefit provided by a handle in the first place.

Thus, solving one problem with the prior art demands solving multiple other problems in concert. This highlights the reason why providing a handle has been structurally infeasible in the prior art, partly due to design limitations imposed by standard manufacturing processes. The separate and distinct major shortcomings of prior art plastic restraints compound to create a problem that is greater than the sum of its individual constituents. The cumulative impact of these multiple shortcomings presents a hurdle that has been insurmountable in the prior art. And yet, it can be easily appreciated that such a handle would be indispensable for the intended use of this device, where the user's safety depends on the ability to quickly, easily, and securely grip the proximal end and exert a high amount of tension without slipping or injuring the user's hand.

Whereas prior art cable ties are typically used in situations in which a user can devote as much attention as desired to tightening the cable tie, or in situations in which precise adjustment of the cable tie is unnecessary, the restraint device of the instant invention is designed especially for use in situations in which the user is not afforded such a luxury. Namely, in such situations, the user may have only a very narrow window of time in which to deploy the restraint device accurately and precisely. Being able to accurately position a plastic restraint on a subject and precisely tighten it to a degree that securely restrains, yet is safe to, the user, is imperative. In a dangerous riot situation, in which the user of a plastic restraint has only one chance to get it properly placed without fumbling, prior art plastic restraints are far too unreliable for law enforcement and military personnel to entrust their safety to when carrying out their duties.

The restraint device's 100 structural features as described herein allow for a plastic restraint to be provided in a looped configuration for rapid deployment, equipped with a handle for effective tightening of the device, and include a stop 140 for safe carrying of the device without risk of premature tightening. The combination of these features simultaneously affords the restraint device 100 solutions to several of the most critical inadequacies of the prior art, and allows a plastic restraint to be used in ways previously unimaginable.

In other words, the feasibility of the instant invention's provision of the handle 150 is made feasible if, and only if, the restraint device 100 is provided in a looped configuration having the proximal end 114 of the tape section 110 fed through the aperture 132 of the head 130 in advance. However, providing the restraint device 100 in such a configuration is feasible if, and only if, it includes the stop 140 (or its equivalent) to address the risks brought about by providing a plastic restraint in a looped configuration. The combination of enhancements over the prior art articulated above are indispensable.

In the preferred embodiment, the handle 150 ideally includes a fastening point 170, as represented in various forms in FIGS. 7, 8, 9, 10, and 11. Such fastening point 170 may be a circular loop or other closed geometric shape integrally formed with the handle 150. The fastening point 170 is best positioned on the top surface 158 of the second section 154 of the handle 150 along the central longitudinal axis of the tape section 110.

In the embodiment shown in FIG. 10 having the handle in the form of a loop 159, the fastening point 170 is best positioned at a central location on the outside surface of the loop 159. Such loop 159 may be constructed from the same material as the tape section 110 or a different material, and may be integrally formed with the tape section 110.

The fastening point 170 expands the functionality and versatility of the restraint device 100, allowing it to be used for restraint techniques that would otherwise not be possible with a plastic restraint. Specific examples are found in FIGS. 12, 13, 14, 15, and 16, and are elaborated on in more detail throughout this disclosure. The embodiment of the fastening point 170 shown in FIGS. 7 and 8 is preferred because it is well suited for being integrally formed with the handle 150 during the handle's manufacturing process. One of ordinary skill in the relevant art would also recognize that the fastening point 170 may alternatively be provided by a hold formed in the handle 150.

Figure 11:
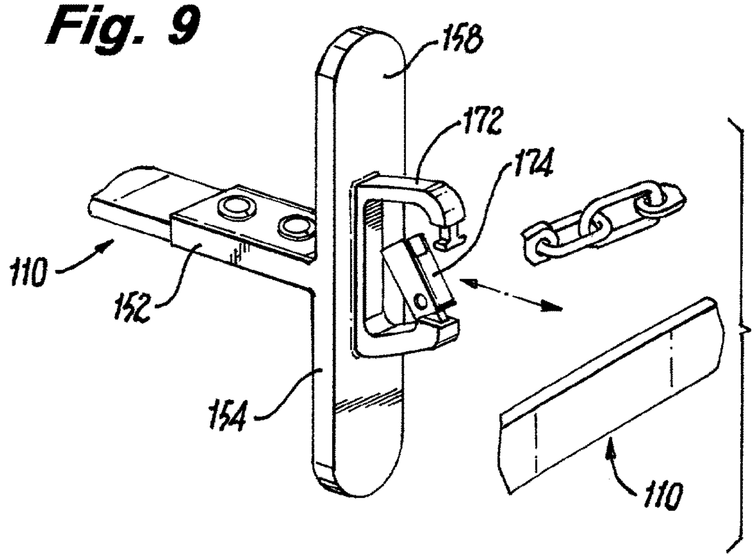
FIG. 11 is a front perspective view of a proximal end of a restraint device built in accordance with a gated fastening point embodiment of the present invention shown in an open gate state.

In an alternate embodiment, the fastening point 170 may incorporate a gate 174 configured to selectably open and close to provide a gated fastening point 172, with the gate 174 spring biased to a closed position, as shown in FIG. 11. This provides a self-closing gate while accommodating fast and easy one-handed operation, even when wearing gloves. The gate 174 may be opened by simply depressing it with the thumb while gripping the handle 150, or pressing the gate 174 against an anchor point (such as a handcuff chain as shown in FIG. 11). In practice, this facilitates attachment of the handle 150 with another restraint device 100 in the absence of additional gear, such as an additional pair of handcuffs.

It is recognized that this is not the preferred embodiment because of potentially reduced security compared to embodiments of the fastening point 170 that cannot be opened. However, while some embodiments of the gated fastening point 172 may be capable being opened by a subject who is restrained by the restraint device 100, the gated fastening point 172 is not rendered useless. This is because the gated fastening point 172 is not utilized for binding a subject's ankles together or binding a subject's wrists together. Rather, the gated fastening point 172 facilitates bridging two restraint devices 100 together, one of which independently binds the subject's ankles together and the other of which independently binds the subject's wrists together, respectively.

Thus, if the subject decouples the gated fastening point 172 of one restraint device 100 from the other restraint device 100, this merely removes the link between the two restraint devices 100, but leaves the subject's wrists bound together by one of the restraint devices 100 and the subject's ankles bound together by the other independent restraint device 100. In other words, unwanted decoupling of the gated fastening point 172 from a second restraint device 100 at most enables a subject to escape the hogtie position illustrated in FIG. 13 or the front hogtie position illustrated in FIG. 14, but does not offer a path to separating the wrists or separating the ankles. In light of the above-described potential drawbacks of the gated fastening point 172, the preferred embodiment relies on the fastening point 170 of the non-gated type, as depicted in FIGS. 7, 8, 9, and 10, because it far more resistant to unwanted tampering or circumvention.

To enhance the security of the gated fastening point embodiment, the gate 174 may feature automatic locking or manual locking, as is commonly featured on prior art carabiners. It is recognized that the fastening point 170 may utilize various other closure mechanisms in place of the gate 174, such as those used in pin shackles, threaded shackles, twist shackles, snap shackles, soft shackles, and other known shackles. A more thorough explanation of these alternatives is not provided for the sake of brevity, since the use of such substitutions would be apparent to one of ordinary skill in the relevant art. Yet another embodiment comprises two or more fastening points 170 on the handle 150 for greater versatility.

With the fastening point 170 positioned at a location on the handle 150 in line with the central longitudinal axis of the tape section 110, tension applied to the fastening point 170 will be aligned with and directed through the tape section 110 along this axis. This allows such force to be transmitted linearly through the tape section 110 without bending the tape section 110 or rotating or cross-loading the handle 150. This can help preserve the integrity of the tape section 110 and its connection to the handle 150. It also facilitates maintaining the fastener 150 in its intended orientation for use.

The fastening point 170 also provides a convenient means for carrying one or more restraint devices 100. Specifically, a carabiner, clip, or other fastener on the user's belt or clothing can engage the fastening point 170, allowing the restraint device 100 to hang thereby. In this manner, a large number of the restraint device 100 can be carried adjacent each other in a compact space so as to not impede the user's mobility, agility, or access to other gear on the belt, such as a firearm. Multiple units of the restraint device 100 may be carried on a single carabiner, clip, or other fastener, or each of multiple units may be carried on its own dedicated carabiner, clip, or other fastener. Either method allows for efficient use of valuable space on a user's gear belt while keeping multiple units of the restraint device 100 organized so that they can be drawn without hesitation. In direct contrast to the restraint device 100 of the present invention, prior art handcuffs are incapable of being carried in large numbers as easily due their greater weight and bulkiness.

Turning now to FIGS. 1, 2, 12, 13, 14, 15, and 16, several intended uses of the restraint device 100 are enumerated. In using the restraint device 100 to bind a subject's ankles, it is slipped over the subject's feet and up around the ankles in its expanded state, as depicted in FIG. 2. The user then pulls on the handle 150 to cinch the loop defined by the tape section 110 down into a contracted state until reaching the desired level of tightness, depicted in FIG. 12. Similarly, the restraint device 100 may be slipped over the subject's hands and up around the wrists, and then tightened to bind the subject's wrists together.

Figure 13:
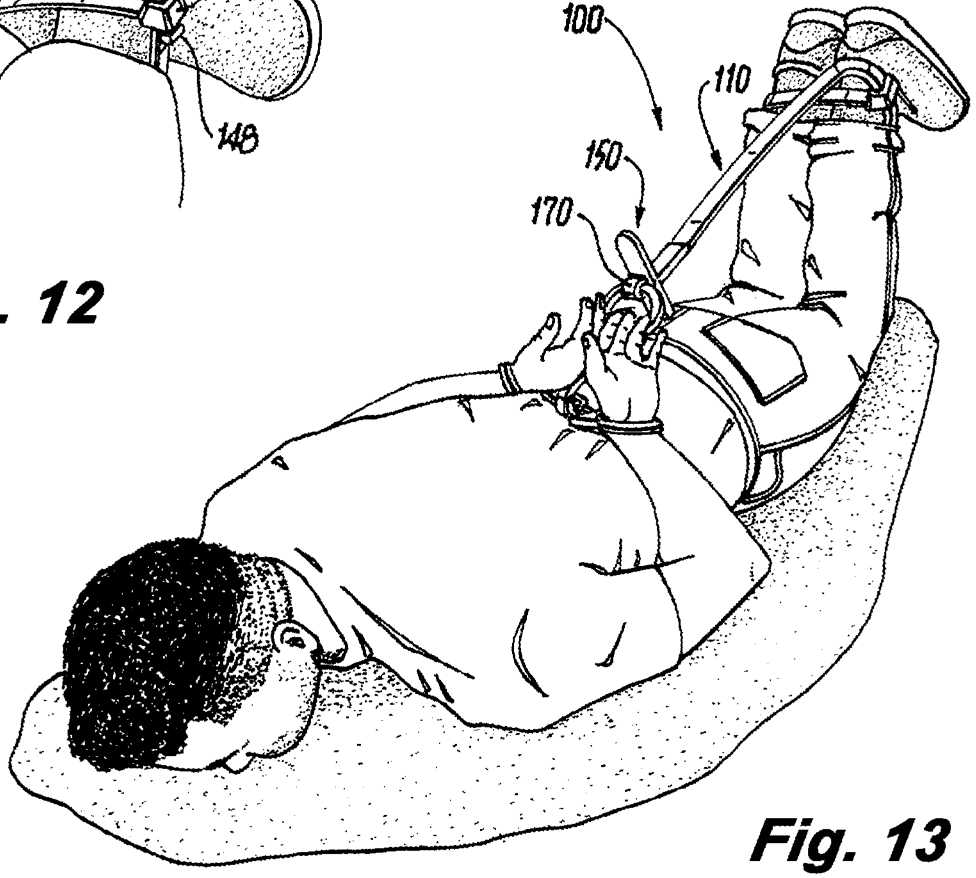
FIG. 13 is a front perspective view of a restraint device built in accordance with the present invention shown restraining a subject in a hogtie position.

The restraint device 100 does not necessarily serve as a complete replacement for standard handcuffs in every instance. Rather, the restraint device 100 can be an invaluable tool when used in conjunction with handcuffs. A representative example of this is portrayed in FIG. 13, in which the restraint device 100 and a pair of handcuffs are used in combination to accomplish a restraint technique commonly referred to as a hogtie technique. In accordance with this technique, a subject is handcuffed behind the back using standard handcuffs, and the subject's ankles are bound together using the restraint device 100. This enables the handle 150 of the restraint device 100 to be attached to the handcuffs. This may be accomplished using a second pair of handcuffs by attaching one cuff of the second pair of handcuffs to the first pair of handcuffs (which are binding the subject's wrists) and attaching its other cuff to the fastening point 170 of the restraint device 100, as shown in FIG. 13. When using a restraint device 100 of the embodiment not having a gated fastening point 172, such as the embodiments of FIGS. 7, 8, 9, and 10, a second pair of handcuffs provides a readily available means for attaching the restraint device 100 to the first pair of handcuffs. Alternatively, when using a restraint device 100 having a gated fastening point 172 as in the embodiment of FIG. 11, the gated fastening point 172 may receive and attach directly to the chain of the first pair of handcuffs as illustrated in FIG. 11, obviating the need for a second pair of handcuffs as a bridge.

FIG. 11 further shows that the gated fastening point 172 is configured to receive and attach to the tape section 110 of an independent restraint device 100. Thus, a first restraint device 100 can be used to bind a subject's wrists together in place of handcuffs, and a second restraint device 100 can be used to bind the subject's ankles together. Then, a gated fastening point 172 on either or both of these restraint devices can receive and attach to the tape section 110 of the other of these restraint devices, respectively. Of course, a pair of handcuffs can alternatively be used to connect these two restraint devices, regardless of whether their fastening points are of the gated or non-gated variation. Similarly, as depicted in FIG. 14, a comparative technique can be used to tether a subject's wrists to their ankles in front of their body, which may be more pragmatic when restraining a subject in the backseat of a law enforcement vehicle.

The versatility of the restraint device 100 also allows it to be used to bind a subject's legs together at a point above the ankles, such as around the knees, as appreciated in FIG. 15. This restraint technique affords the subject enough independent movement of the feet to slowly shuffle with small steps to facilitate transporting the subject, while limiting the subject's stride enough to prevent running or walking too quickly, thereby minimizing the possibility of escaping custody.

In riot situations, it is contemplated that a user may need to restrain multiple subjects as quickly as possible before relocating them. For instance, if a user restrains a subject and then devotes the requisite time and attention to transporting that subject, the user is no longer available to perform other critical tasks. For this reason, carrying multiple units of the restraint device 100 can be invaluable. As shown in FIG. 16, the restraint device 100 may be used to bind one leg of a first subject to one leg of a second subject. In this manner, multiple subjects can be bound together in tandem, thereby rendering it immensely more difficult for the subjects to flee.

There are copious additional uses for the invention described herein that, for brevity, have not been elaborated on, but which would be apparent to one of ordinary skill in the art. These include, but are not limited to, use of the device to bind gear together, to drag, haul, or carry gear or some other load, and use as an improvised handle for acquiring an enhance grip on something.

A person of ordinary skill in the art, and experienced law enforcement and military personnel in particular, will immediately recognize the usefulness of such a device. Put simply, this restraint device is an elegant solution to the problems posed by prior art restraint devices and effectively overcomes their shortcomings. This device, while relatively simple in design, is extraordinarily powerful when in the hands of skilled law enforcement and military personnel. While this disclosure does not necessarily advocate for the uses of the restraint device described herein, the disclosure is intended to demonstrate the capabilities of the invention against the backdrop of its potential uses.

It is to be understood that the invention is not limited in its application to the details of construction and to the arrangements of the elements set forth in the accompanying description or illustrated in the drawings. The invention is capable of other embodiments and of being practiced and carried out in various ways. Also, it is to be understood that the phraseology and terminology employed herein are for the purpose of description and should not be regarded as limiting. The disclosure may readily be utilized as a basis for the designing of other structures, methods, and systems for carrying out the present invention. It is important, therefore, that the claims be regarded as including equivalent constructions. The abstract and the disclosure are neither intended to define the invention, which is measured by the claims, nor are they intended to be limiting as to the scope of the invention in any way.

What is claimed is:

1. A restraint device, comprising:

a tape section having a proximal end and a distal end;

a handle operatively connected to the proximal end of the tape section;

a head positioned at the distal end of the tape section, wherein the head has an aperture dimensioned large enough for the tape section to enter it and a locking mechanism configured to allow the tape section to travel through the aperture in the head in the direction towards the proximal end and prevent the tape section from traveling through the aperture in the head in the direction towards the distal end;

wherein the proximal end of the tape section passes through the aperture in the head such that the tape section defines a loop;

a detachable stop configured to selectively prevent a part of the tape section that is adjacent to the stop from traveling through the aperture in the head in the direction toward the proximal end;

wherein the tape section has a top surface and a bottom surface, and further includes an integrated rack disposed on the bottom surface;

a blocker configured to prevent the tape section from traveling through the aperture in the head in the direction toward the proximal end, wherein when the restraint device is in an expanded state, the blocker includes a permanent projection on the tape section at a more distal location of the tape section than a portion of the tape section that occupies the aperture in the head; and wherein the locking mechanism includes a pawl configured to cooperate with the rack so as to allow the tape section to travel through the aperture in the head in the direction towards the proximal end, and engage with the rack to prevent the tape section from traveling through the aperture in the head in the direction towards the distal end.

2. The restraint device of claim 1, wherein the stop is disposed on the tape section, and when the restraint device is in an expanded state, the stop is positioned on the tape section at a more distal location of the tape section than a portion of the tape section that occupies the aperture in the head.

3. The restraint device of claim 1, wherein:

the handle includes at least one of (i) a first section substantially parallel to the proximal end of the tape section and a second section substantially perpendicular to the first section and (ii) a loop.

4. The restraint device of claim 1, wherein the handle includes at least one fastening point defined by a closed geometric shape.

5. The restraint device of claim 4, wherein the fastening point has an opening dimensioned large enough for the tape section to enter it and a closure mechanism configured to be selectably opened and closed, wherein the closure mechanism includes a gate that is spring-biased to a closed position.

6. The restraint device of claim 5, wherein the gate includes a gate lock configured to lock the gate in a closed position.

7. The restraint device of claim 1, wherein:

the stop includes a pin; and the tape section includes a stop aperture configured to receive the pin;

wherein when the restraint device is in an expanded state, the stop aperture is located at a more distal location than a portion of the tape section that occupies the aperture in the head.

8. The restraint device of claim 1, wherein the handle is connected at the distal end of the tape section with rivets.

9. A restraint device, comprising:

a tape section having a proximal end, a distal end, a top surface, a bottom surface, and an integrated rack;

a handle operatively connected to the proximal end of the tape section;

a head positioned at the distal end of the tape section, wherein the head has an aperture dimensioned large enough for the tape section to enter it and a locking mechanism configured to allow the tape section to travel through the aperture in the head in the direction towards the proximal end and prevent the tape section from traveling through the aperture in the head in the direction towards the distal end;

a detachable stop disposed on the tape section which is configured to selectively prevent the tape section that is adjacent to the stop from traveling through the aperture in the head in the direction toward the proximal end, wherein when the restraint device is in an expanded state, the stop is positioned on the tape section at a more distal location of the tape section than a portion of the tape section that occupies the aperture in the head;

wherein the proximal end of the tape section passes through the aperture in the head such that the tape section defines a loop;

a blocker configured to prevent the tape section from traveling through the aperture in the head in the direction toward the proximal end, wherein when the restraint device is in an expanded state, the blocker includes a permanent projection on the tape section at a more distal location of the tape section than a portion of the tape section that occupies the aperture in the head; and wherein the locking mechanism includes a pawl configured to cooperate with the rack so as to allow the tape section to travel through the aperture in the head in the direction towards the proximal end, and engage with the rack to prevent the tape section from traveling through the aperture in the head in the direction towards the distal end.

10. The restraint device of claim 9, wherein the handle includes a first section substantially parallel to the proximal end of the tape section and a second section substantially perpendicular to the first section.

11. The restraint device of claim 9, wherein:

the stop includes a pin; and the tape section includes a stop aperture configured to receive the pin;

wherein the stop aperture is located at a more distal location than a portion of the tape section that occupies the aperture in the head.

12. The restraint device of claim 9, wherein the tape section further comprises a layer of padding on the bottom surface.

13. The restraint device of claim 9, wherein the handle includes at least one fastening point defined by a closed geometric shape.

14. The restraint device of claim 13, wherein the fastening point has an opening dimensioned large enough for the tape section to enter it and a closure mechanism configured to be selectably opened and closed, wherein the closure mechanism includes a gate that is spring-biased to a closed position.

15. A restraint device, comprising:

a tape section having a proximal end, a distal end, a planar top surface, a planar bottom surface, an integrated rack, and a layer of padding on the planar bottom surface;

a handle operatively connected to the proximal end of the tape section, wherein the handle includes at least one fastening point defined by a closed geometric shape;

a head positioned at the distal end of the tape section, wherein the head has an aperture dimensioned large enough for the tape section to enter it and a locking mechanism configured to allow the tape section to travel through the aperture in the head in the direction towards the proximal end and prevent the tape section from traveling through the aperture in the head in the direction towards the distal end;

a detachable stop configured to selectively prevent a part of the tape section that is adjacent to the stop from traveling through the aperture in the head in the direction toward the proximal end;

wherein the fastening point has an opening dimensioned large enough for the tape section to enter it and a closure mechanism configured to be selectably opened and closed, wherein the closure mechanism includes a gate that is spring-biased to a closed position;

wherein the proximal end of the tape section passes through the aperture in the head such that the tape section defines a loop;

a blocker configured to prevent the tape section from traveling through the aperture in the head in the direction toward the proximal end, wherein when the restraint device is in an expanded state, the blocker includes a permanent projection on the tape section at a more distal location of the tape section than a portion of the tape section that occupies the aperture in the head; and wherein the locking mechanism includes a pawl configured to cooperate with the rack so as to allow the tape section to travel through the aperture in the head in the direction towards the proximal end, and engage with the rack to prevent the tape section from traveling through the aperture in the head in the direction towards the distal end.

16. The restraint device of claim 15, wherein the handle is connected at the distal end of the tape section with.

17. The restraint device of claim 15, wherein:

the stop includes a pin; and the tape section includes a stop aperture configured to receive the pin;

wherein when the restraint device is in an expanded state, the stop aperture is located at a more distal location than a portion of the tape section that occupies the aperture in the head.

* * * * *